US007099132B2

(12) United States Patent
Moisin

(10) Patent No.: US 7,099,132 B2
(45) Date of Patent: Aug. 29, 2006

(54) CIRCUIT HAVING POWER MANAGEMENT

(76) Inventor: Mihail S. Moisin, 8 Druce St., Brookline, MA (US) 02445

( * ) Notice: Subject to any disclaimer, the term of this patent is extended or adjusted under 35 U.S.C. 154(b) by 355 days.

(21) Appl. No.: 10/686,474

(22) Filed: Oct. 15, 2003

(65) Prior Publication Data

US 2004/0183474 A1 Sep. 23, 2004

Related U.S. Application Data

(60) Provisional application No. 60/455,826, filed on Mar. 19, 2003.

(51) Int. Cl.
*H02H 3/20* (2006.01)

(52) U.S. Cl. .................. 361/91.1; 361/18; 315/DIG. 4

(58) Field of Classification Search .................... None
See application file for complete search history.

(56) References Cited

U.S. PATENT DOCUMENTS 3,859,555 A 1/1975 Latassa et al.
4,030,013 A * 6/1977 Watrous .................... 320/123
4,580,013 A 4/1986 Moisin
4,829,567 A 5/1989 Moisin
4,864,609 A 9/1989 Moisin
4,922,531 A 5/1990 Moisin
5,014,305 A 5/1991 Moisin
5,052,039 A 9/1991 Moisin
5,081,401 A 1/1992 Moisin
5,124,619 A 6/1992 Moisin et al.
5,138,233 A 8/1992 Moisin et al.
5,138,234 A 8/1992 Moisin
5,138,236 A 8/1992 Bobel et al.
5,144,195 A 9/1992 Konopka et al.
5,148,087 A 9/1992 Moisin et al.
5,220,247 A 6/1993 Moisin
5,332,951 A 7/1994 Turner et al.
5,583,402 A 12/1996 Moisin et al.
5,608,295 A 3/1997 Moisin
5,686,799 A 11/1997 Moisin et al.
5,691,606 A 11/1997 Moisin et al.
5,798,617 A 8/1998 Moisin
5,821,699 A 10/1998 Moisin
5,866,993 A 2/1999 Moisin
5,867,358 A * 2/1999 Campbell .................... 361/47
5,877,926 A 3/1999 Moisin
5,925,986 A 7/1999 Moisin
5,955,841 A 9/1999 Moisin et al.
5,982,111 A 11/1999 Moisin
6,011,362 A 1/2000 Moisin
6,020,688 A 2/2000 Moisin
6,028,399 A 2/2000 Moisin
6,037,722 A 3/2000 Moisin
6,051,936 A 4/2000 Qian
6,069,455 A 5/2000 Moisin
6,091,288 A 7/2000 Moisin
6,100,645 A 8/2000 Moisin
6,100,648 A 8/2000 Moisin
6,107,750 A 8/2000 Moisin
6,118,224 A * 9/2000 Murakami et al. .......... 315/244
6,122,182 A 9/2000 Moisin (Continued)

*Primary Examiner*—David Vu
(74) *Attorney, Agent, or Firm*—Daly, Crowley, Mofford & Durkee, LLP

(57) ABSTRACT

A power management circuit includes first and second power control circuits for controlling respective first and second switching elements that energize a load. The power control circuits determine intervals of conduction for the switching elements that define the voltage charging level of the circuit.

37 Claims, 13 Drawing Sheets

U.S. PATENT DOCUMENTS

| | | | |
|---|---|---|---|
| 6,127,786 | A | 10/2000 | Moisin |
| 6,137,233 | A | 10/2000 | Moisin |
| 6,157,142 | A | 12/2000 | Moisin |
| 6,160,358 | A | 12/2000 | Moisin |
| 6,169,375 | B1 | 1/2001 | Moisin |
| 6,181,082 | B1 | 1/2001 | Moisin |
| 6,181,083 | B1 | 1/2001 | Moisin |
| 6,188,553 | B1 | 2/2001 | Moisin |
| 6,194,843 | B1 | 2/2001 | Moisin |
| 6,222,326 | B1 | 4/2001 | Moisin |
| 6,236,168 | B1 | 5/2001 | Moisin |
| 6,281,638 | B1 | 8/2001 | Moisin |
| 6,473,284 | B1 * | 10/2002 | Ilic et al. ................... 361/91.1 |
| 2002/0011806 | A1 | 1/2002 | Moisin |
| 2002/0030451 | A1 | 3/2002 | Moisin |
| 2003/0160571 | A1 | 8/2003 | Moisin |

* cited by examiner

CIRCUIT HAVING POWER MANAGEMENT

CROSS REFERENCE TO RELATED APPLICATIONS

The present application claims the benefit of U.S. Provisional Patent Application No. 60/455,826 filed on Mar. 19, 2003, which is incorporated herein by reference.

STATEMENT REGARDING FEDERALLY SPONSORED RESEARCH

Not Applicable.

FIELD OF THE INVENTION

The present invention relates generally to electrical circuits and, more particularly, to electrical circuits for controlling power to a load.

BACKGROUND OF THE INVENTION

As is known in the art, there are a variety of circuits that limit the energy in a circuit. For example, dimming circuits for lighting applications adjust the brightness of a light source. Exemplary power control, dimming, and/or feedback circuits are shown and described in U.S. Pat. Nos. 5,686,799, 5,691,606, 5,798,617, and 5,955,841, all of which are incorporated herein by reference.

However, known power control/dimmer circuits typically have significant performance degradation for non-linear loads. Some known circuits have feedback from the load that can generate significant Electromagnetic Conductive interference (EMC), which degrades circuit performance and limits use of the feedback.

FIG. 1 shows an exemplary prior art dimming circuit 10 having a diac D coupled to a triac TR gate. A resistor R and a potentiometer P are coupled as shown. A black wire terminal BLK is coupled to the resistor R and the triac TR and a white wire terminal WH is coupled to the load LD, which is coupled to the potentiometer P and the triac TR, as shown.

As shown in FIG. 2, when the voltage across the potentiometer P reaches a predetermined level VT, the diac D fires and the triac TR enables the circuit to become conductive. An input signal IS has a conductive region CR and non-conductive region NCR based upon when the diac fires.

While this circuit arrangement may be effective for linear loads, non-linear loads may render the circuit unstable. In addition, storage capacitors and other energy storage devices will charge to a voltage level corresponding to the peak Vp of the input signal. That is, the non-linear load selects the charge voltage level. In addition, current surges are not generated at optimal times and can degrade circuit performance.

It would, therefore, be desirable to overcome the aforesaid and other disadvantages.

SUMMARY OF THE INVENTION

The present invention provides a power management circuit that eliminates peak-charging of charge storage elements. With this arrangement, a non-linear load can be energized in a stable and efficient manner. While the invention is primarily shown and described in conjunction with circuits for energizing lamps, it is understood that the invention is applicable to circuits for energizing loads in general in which it is desirable to provide lower power levels, e.g., dimming, as well as overvoltage and current surge protection.

In one aspect of the invention, a power management circuit includes first and second switching elements coupled across first and second rails for energizing a load, and a first power control circuit coupled to the first switching element. The first power control circuit biases the first switching element to a non-conductive state for a portion of an AC half cycle during which a peak voltage of the AC half cycle occurs when a voltage across the first and second rails is greater than a predetermined threshold. In one particular embodiment, a period of non-conduction for the first switching element is centered about a peak of the AC signal. With this arrangement, energy storage elements charge to a level that corresponds to the predetermined voltage threshold instead of the peak voltage as in conventional circuits since this predetermined voltage represents the peak voltage.

In another aspect of the invention, the circuit includes a current sensing circuit coupled to the first switching element for providing current surge protection.

BRIEF DESCRIPTION OF THE DRAWINGS

The invention will be more fully understood from the following detailed description taken in conjunction with the accompanying drawings, in which.

DETAILED DESCRIPTION OF THE INVENTION

Figure 1:
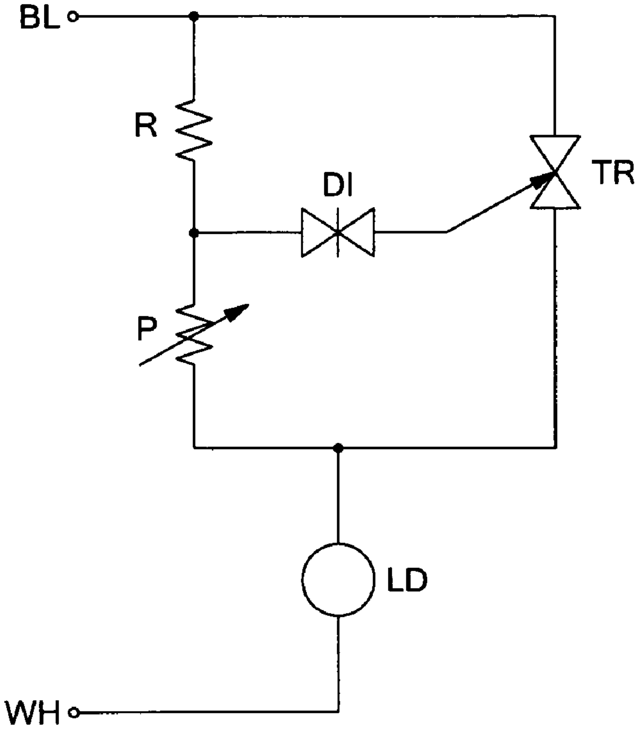
FIG. 1 (PRIOR ART)
FIG. 1 is a schematic diagram of a prior art wall dimmer circuit.
Figure 2:
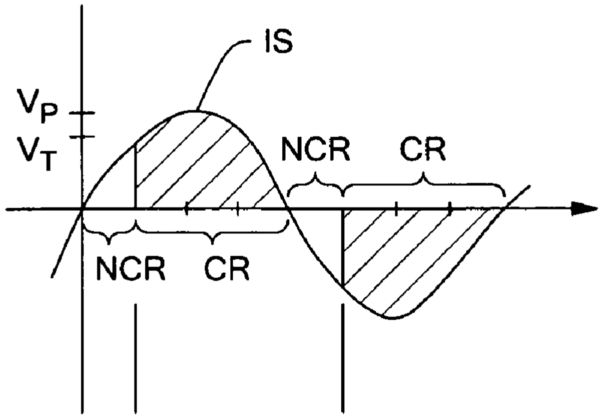
FIG. 2 (PRIOR ART)
FIG. 2 is a graphical display of a voltage waveform generated by the prior art circuit of FIG. 1.
Figure 3:
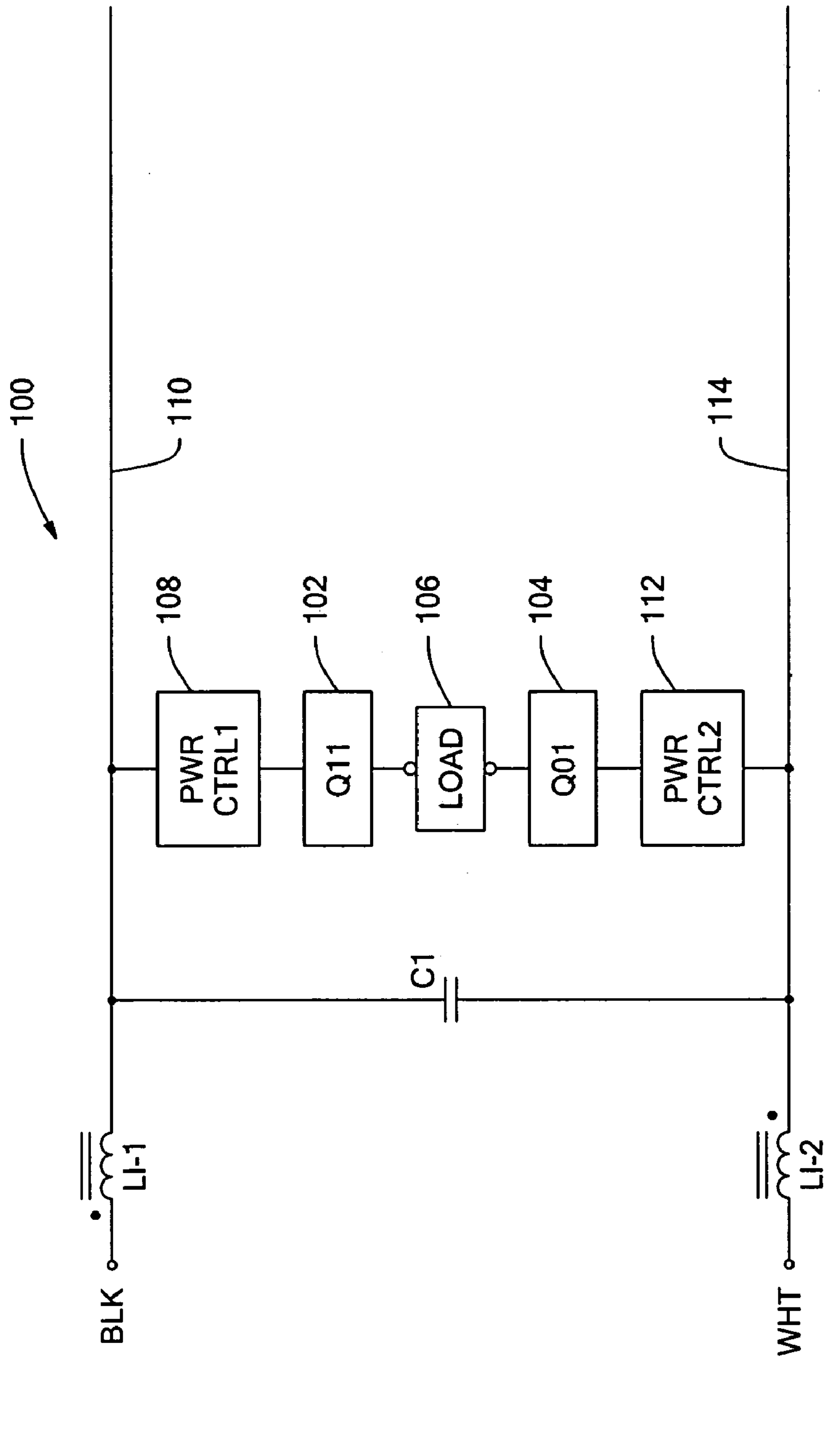
FIG. 3 is a schematic representation of a circuit having power management in accordance with the present invention.

FIG. 3 shows an exemplary circuit 100 having power management in accordance with the present invention. The circuit 100 includes first and second switching elements 102, 104 coupled in a half bridge configuration for energizing a load 106. A first power control circuit 108 is coupled between a first voltage rail 110 and the first switching element 102 and a second power control circuit 112 is coupled between the second switching element 104 and a second voltage rail 114. First and second mutually coupled inductors L1-1, L1,2 and a capacitor C1 can provide an input EMC filtering stage for an input signal received on first and second terminals BLK, WHT. In one embodiment, the first input terminal BLK corresponds to a conventional black wire and the second input terminal WHT corresponds to a conventional white wire on which a standard 120 V AC signal can be provided.

In general, the power control circuits 108,112 select conduction and non-conduction regions for the switching elements 102, 104 such that energy storage devices, e.g., bulk storage capacitors, are charged to a predetermined level even in the presence of non-linear loads. That is, so-called peak charging of the capacitor at the peak of the line voltage is eliminated. In addition, surge current levels are significantly reduced as compared with conventional circuits.

Figure 4:
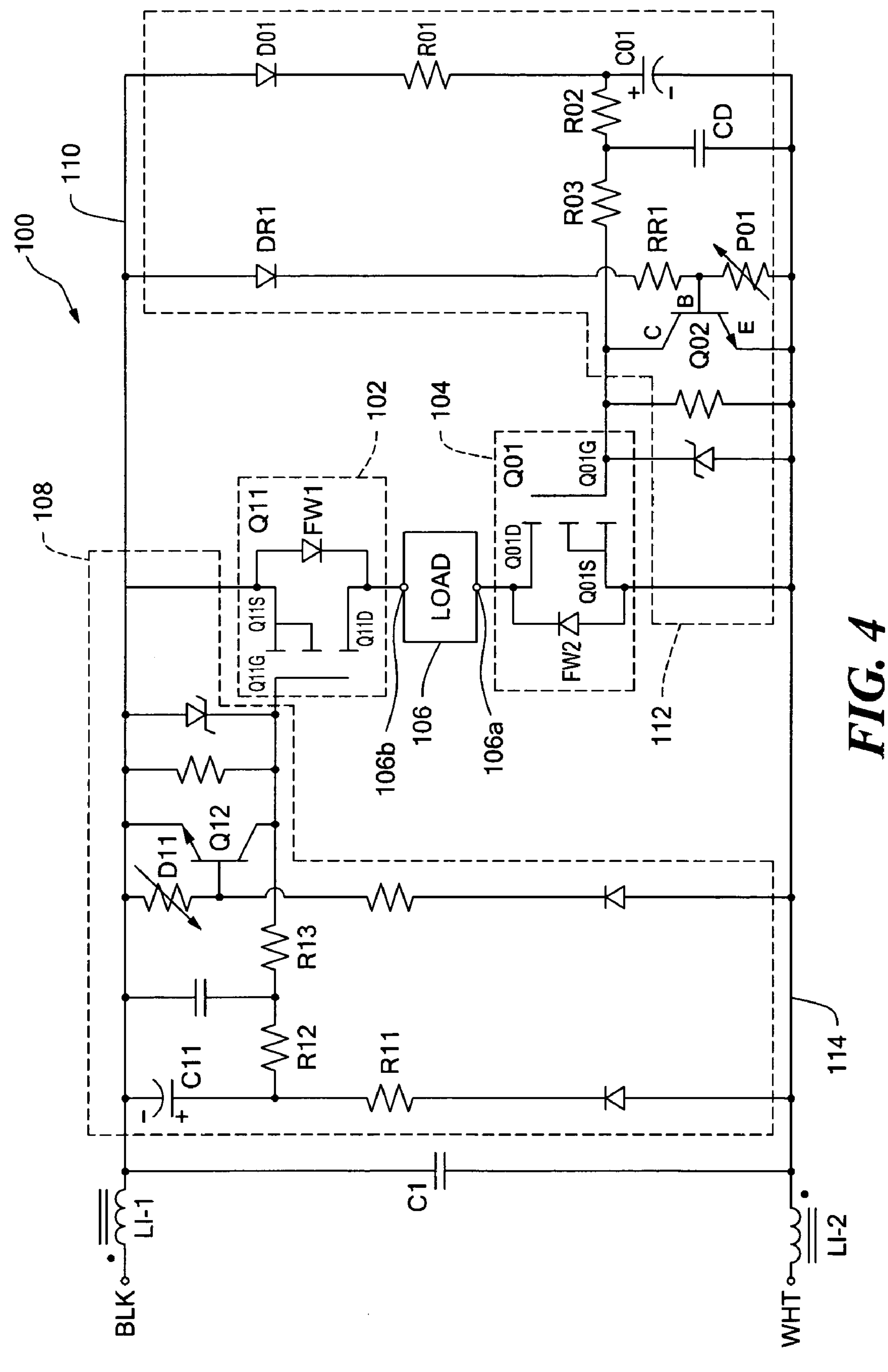
FIG. 4 is an exemplary circuit implementation of the circuit of FIG. 3

FIG. 4 shows an exemplary circuit implementation of the circuit of FIG. 3, in which like reference numbers indicate like reference elements. It is understood that the first and second power control circuits 108,112 may be active in opposite half cycles of the AC signal to the load 106. It is further understood that the operation of only one of the power control circuits will be explained since operation of the second mirrors that of the other. In addition, while first and second power control circuits are shown, alternative embodiments are contemplated having a single power control circuit for controlling one of the switching elements.

The first and second switching elements 102, 104 are shown as MOSFET devices each having respective gate Q01G, Q11G, source Q01S, Q11S, and drain Q01D, Q11D terminals. The source terminal Q11S of the first switching element is coupled to the first rail 110 and the drain terminal Q11D is coupled to a first terminal 106a for connection to the load. The gate terminal Q11G is coupled to the first power control circuit 108. The drain Q01D of the second switching element Q01 is coupled to a second load terminal 106*b* and the source Q01S is coupled to the second voltage rail 114. And the gate terminal Q01G is coupled to the second power control circuit 112.

While the switching devices are shown as Bipolar Junction Transistors (BJTs) and Field Effect Transistors (FETs), it will be readily understood by one of ordinary skill in the art that a wide variety of switching devices can be used in other embodiments to meet the requirements of a particular application. It is also understood that while a half bridge configuration is shown, a variety of other circuit arrangements, such as full bridge topologies, can be used without departing from the present invention.

Looking to the bottom right of FIG. 4, the second power control circuit 112 includes a first control switching element Q02, here shown as a bipolar transistor having a base B, a collector C, and an emitter E terminal. The collector terminal C is coupled to the gate Q01G of the first switching element Q01 and the emitter terminal E is coupled to the second voltage rail 114. A first potentiometer P01 has a first terminal coupled to the second voltage rail 114 and a second terminal coupled to the base terminal B, which is coupled to the first voltage rail 110 via a resistor RR1 and a diode DR1.

A first capacitor C01, a first resistor R01, and a first diode D01 are coupled end-to-end across the first and second rails 110, 114. Second and third resistors R02, R03 are coupled in series from the gate terminal Q01 G to a point between the first capacitor C01 and the first resistor R01. A capacitor CD can be coupled from the second rail 114 to a point between the second and third resistors R02, R03.

In operation, as the circuit operates to energize the load 106, the second switching element 104 is biased to the conductive state by a potential applied to the gate terminal Q01G by energy stored in the first capacitor C01, which charges via the first diode D01 and the first resistor R01. The energy stored in the first capacitor C01 maintains the conductive state of the second switching element 104. The first switching element 102 is biased to the conductive state by the first power control circuit 108 in a similar manner to provide an AC signal to the load 106. Control of each of the switching elements 102, 104 is being performed on a half cycle basis, while the conduction function of the opposite switching element is performed by conventional first and second free-wheeling diodes FW1, FW2 connected across the respective transistors.

When the voltage across the first potentiometer P01 becomes greater than a predetermined threshold Vth this potential, which is applied to the base B of the first control switching element Q02, causes the first control switching element to transition to the conductive state. As the first control switching element Q02 becomes conductive, the gate Q01G of the second switching element 104 is coupled to the second rail 114 so as to turn the second switching element off. Thus, the potentiometer P01, which "reads" the voltage between the first and second voltage rails 110, 114 in combination with resistor RR1 and diode DR1, can be adjusted to select the predetermined threshold voltage Vth across the rails 110, 114 that is effective to turn the second control switching element Q02 ON (conductive) and consequently the second switching element 104 is turned OFF (non-conductive).

In one embodiment, the first and second power control circuits 108, 112 mirror operation of each other with matched potentiometers so that the first and second switching elements 102, 104 are turned off at substantially the same point in the AC load waveform.

Figure 4A:
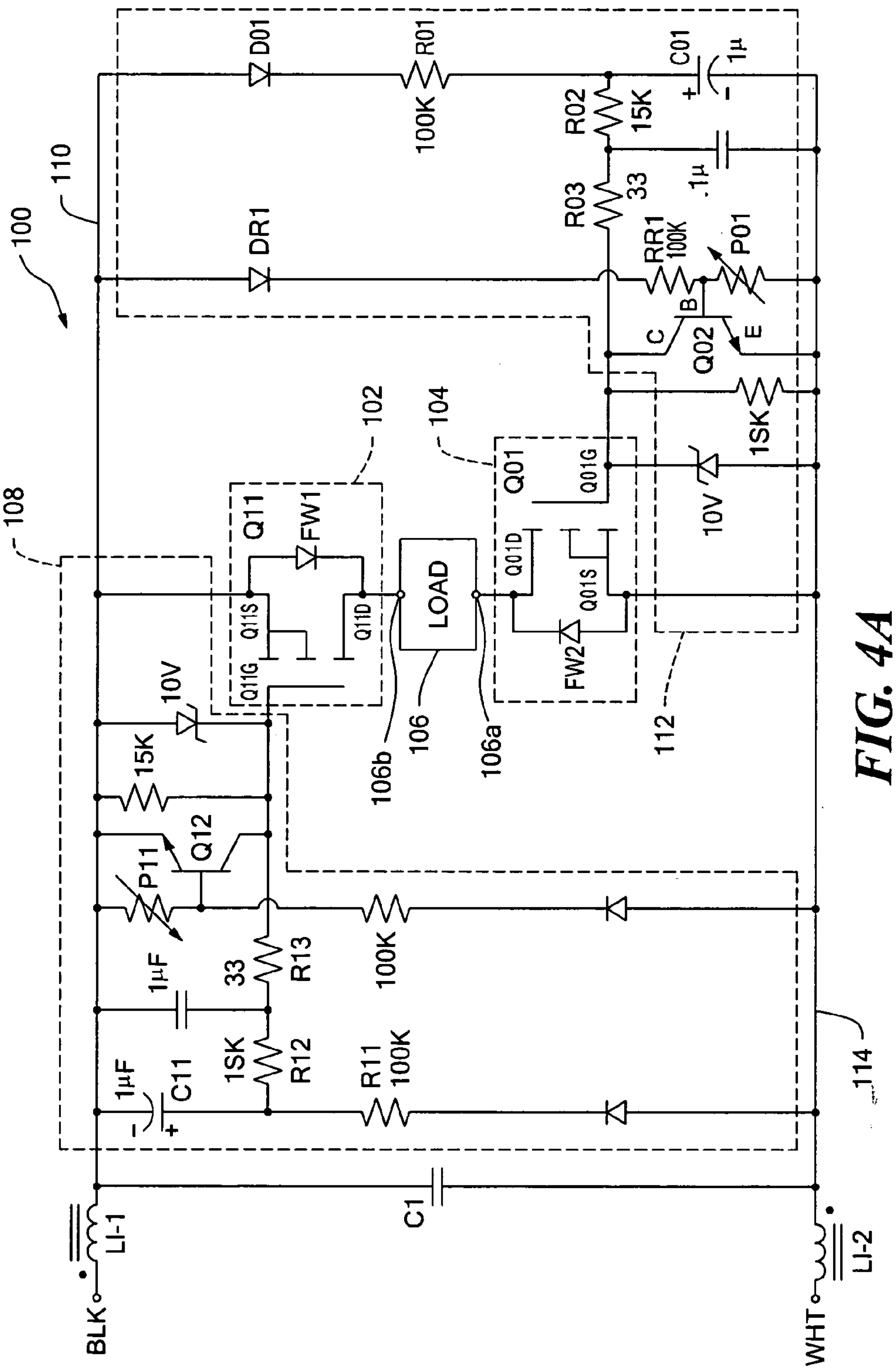
FIG. 4A is an exemplary circuit implementation of the circuit of FIG. 4 further including exemplary values for component characteristics.

FIG. 4A shows the circuit of FIG. 4 with the addition of component characteristic values. It is understood that exemplary values for circuit components are shown without limiting the invention to any particular values. One of ordinary skill in the art can readily vary component characteristics to meet the needs of a particular application.

Figure 5A:
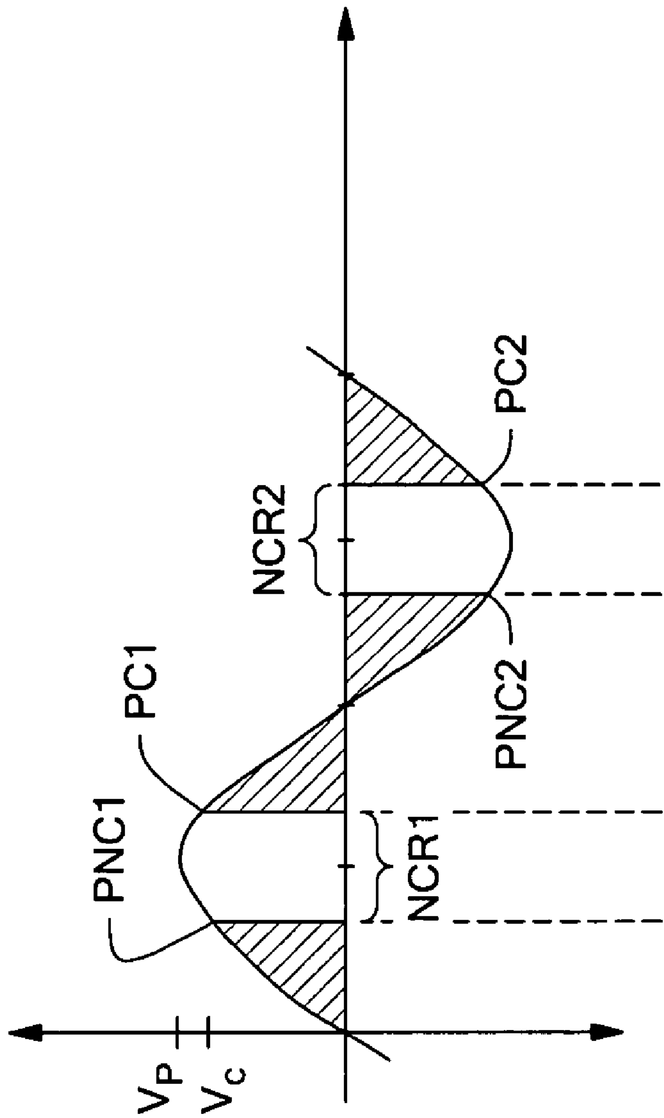
FIG. 5A is a graphical display of an exemplary voltage waveform generated by the circuit of FIG. 4.

FIG. 5A, in combination with FIG. 4, shows the points PNC1, PNC2 at which the first and second switching elements 102, 104 turn non-conductive and the points PC1, PC2 at which the first and second switching elements turn conductive. For each half cycle there is a non-conductive region NCR1, NCR2 during which one of the switching elements 102, 104 is non-conductive. As can be seen, when the voltage on the potentiometer P01 reaches the voltage threshold Vth, which corresponds to the peak charging voltage Vc, the active switching element 102 or 104 for the half cycle turns off at point PNC1 until a corresponding point PC1 when the signal across the first and second rails 110, 114 falls below the voltage threshold Vth and the switching element 102 or 104 becomes conductive again. The voltage threshold Vth on the potentiometer P01 corresponds to a voltage level Vc across the first and second AC rails 110, 114, which can be below the peak voltage level Vp of the AC load signal.

Figure 5B:
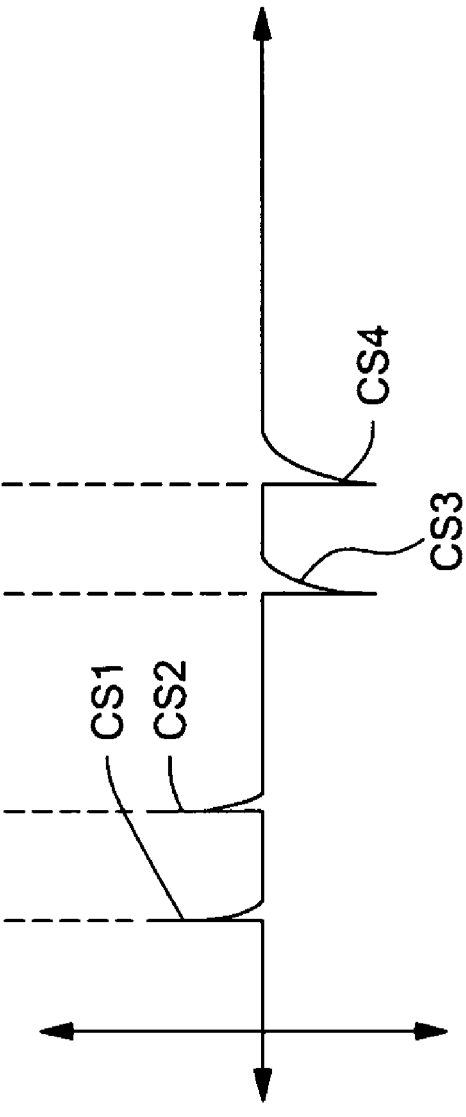
FIG. 5B is a graphical display of an exemplary current waveform generated by the circuit of FIG. 4.

FIG. 5B shows the current surges CS1–4 that correspond to the transition points PNC1, PNC2, PC1, PC2 of FIG. 5A. As can be seen, there are four current surges Cs1–4 per cycle instead of two current surges in conventional circuits. The frequency of the current surges is twice that of the input signal. For example, the current surge frequency may be about 120 Hz instead of 60 Hz so as to reduce visible light flicker and reduce noise. In addition, the magnitude of the four current surges CS1–4 is significantly less than current surges at the AC signal peak in conventional circuit, so as to significantly reduce stress on the circuit components.

In addition, energy storage elements, such as bulk capacitors, charge to the voltage level of the AC signal at the transition points PC1, PNC1, PC2, PNC2. Thus, the voltage level Vc to which storage capacitors charge can be selected by adjusting the potentiometer P01 in the power control circuit 112. Once again, it is understood that references to components and operation of the second power control circuit 112 are also applicable to the first power control circuit 108 and the first switching element 102. Furthermore, the non-conductive regions NCR1, NCR2 can be sized to meet the needs of a particular application, such as dimming. For example, the light source brightness can correspond to the voltage level Vc (FIG. 5A) to which storage elements charge, thus directly controlling the DC voltage available to the power circuit.

Figure 5C:
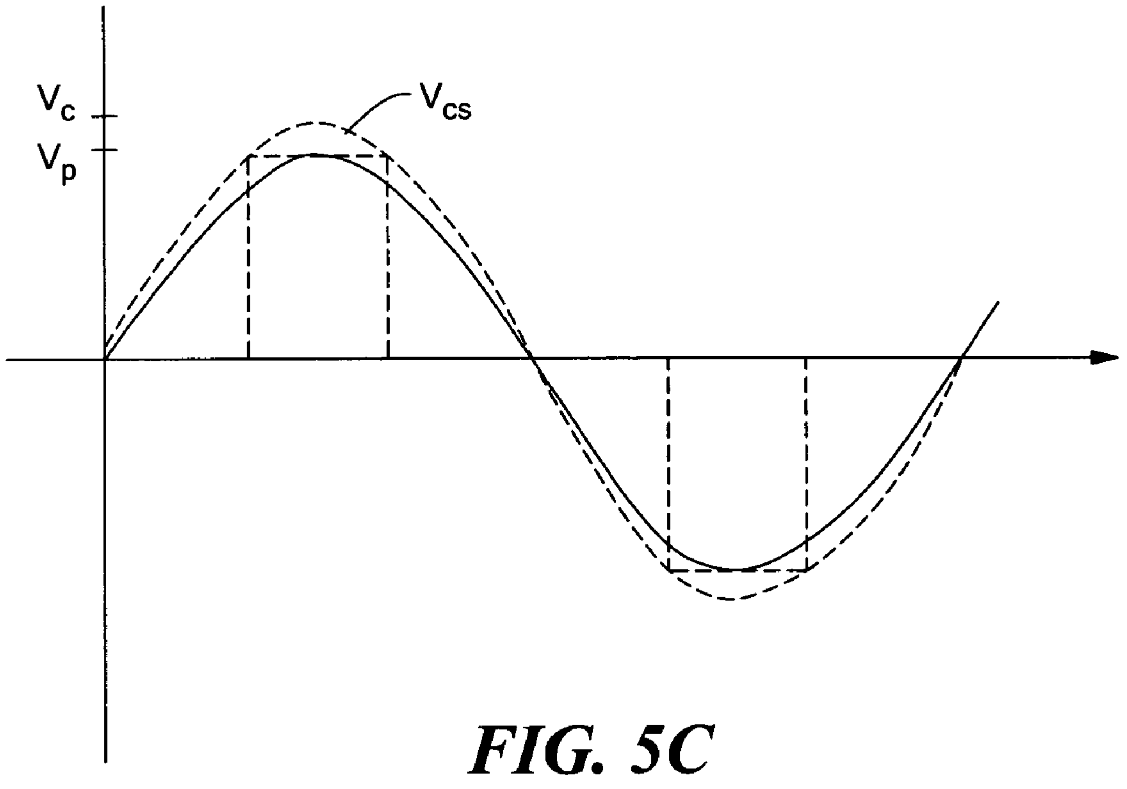
FIG. 5C is a graphical depiction of a waveform showing overvoltage protection in accordance with the present invention.

FIG. 5C shows an exemplary embodiment in which the threshold voltage Vth for the potentiometer P01 is selected to limit the charging voltage Vc to a level that is slightly above the expected peak voltage Vp of the AC signal. If there is a voltage surge, the AC signal voltage is clamped at Vc and a non-conductive region is created during the time during which the voltage across the first and second rails 110, 114 is above the expected peak voltage Vp. Thus, overvoltage protection is provided by clamping the voltage level.

Figure 6:
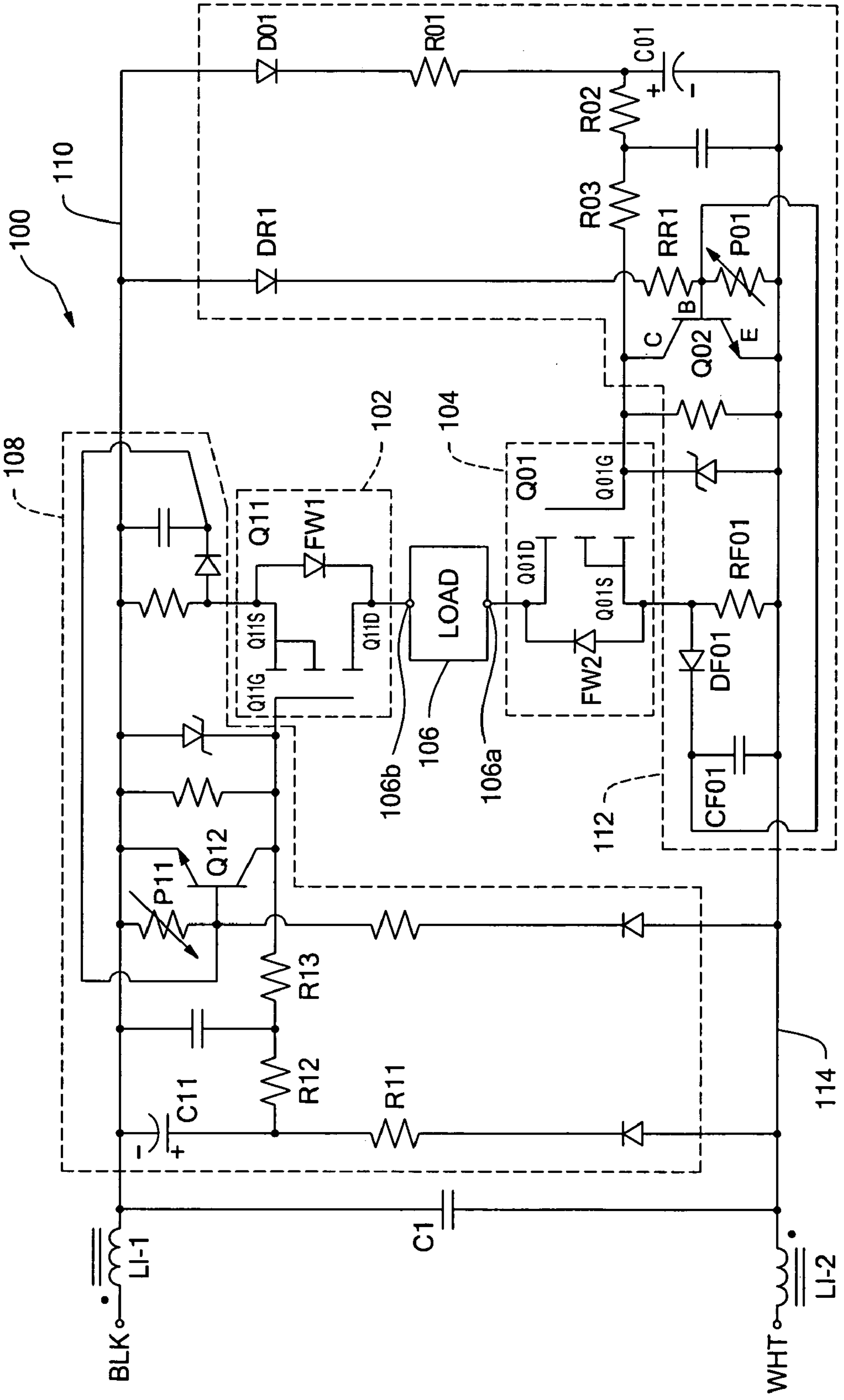
FIG. 6 is an exemplary circuit implementation of the circuit of FIG. 4 further including current limiting features in accordance with the present invention.

FIG. 6 shows a circuit 100' having power management including current surge protection in accordance with the present invention. It is understood that certain features described below are added to the circuit of FIG. 4, for which like reference numbers indicate like elements. In an exemplary embodiment, the first power control circuit 112' includes a sense resistor RF01 coupled between the source terminal Q01S of the second switching element and the second AC rail 114. A diode DF01 is coupled between the source terminal Q01S and the base B of the first control switching element Q02. A capacitor CF01 is coupled between the base terminal B and the second AC rail 114 such that the sense resistor RF01, capacitor CF01 and diode DF01 form a current limiting mechanism in conjunction with the second control switching element Q02.

If the current through the second switching element 104 generates a voltage across the sense resistor RF01 that is greater than a predetermined voltage sufficient to bias the first control switching element Q02 to the conductive state via the base terminal B, the second switching element 104 is turned off. Thus, current through the second switching element 104 is limited to a predetermined level. It is understood that an impedance level of capacitor CF01 can be selected to maintain the first control switching element Q02 to the conductive state for a predetermined amount of time, which can correspond to a desired number of AC signal cycles.

Figure 7:
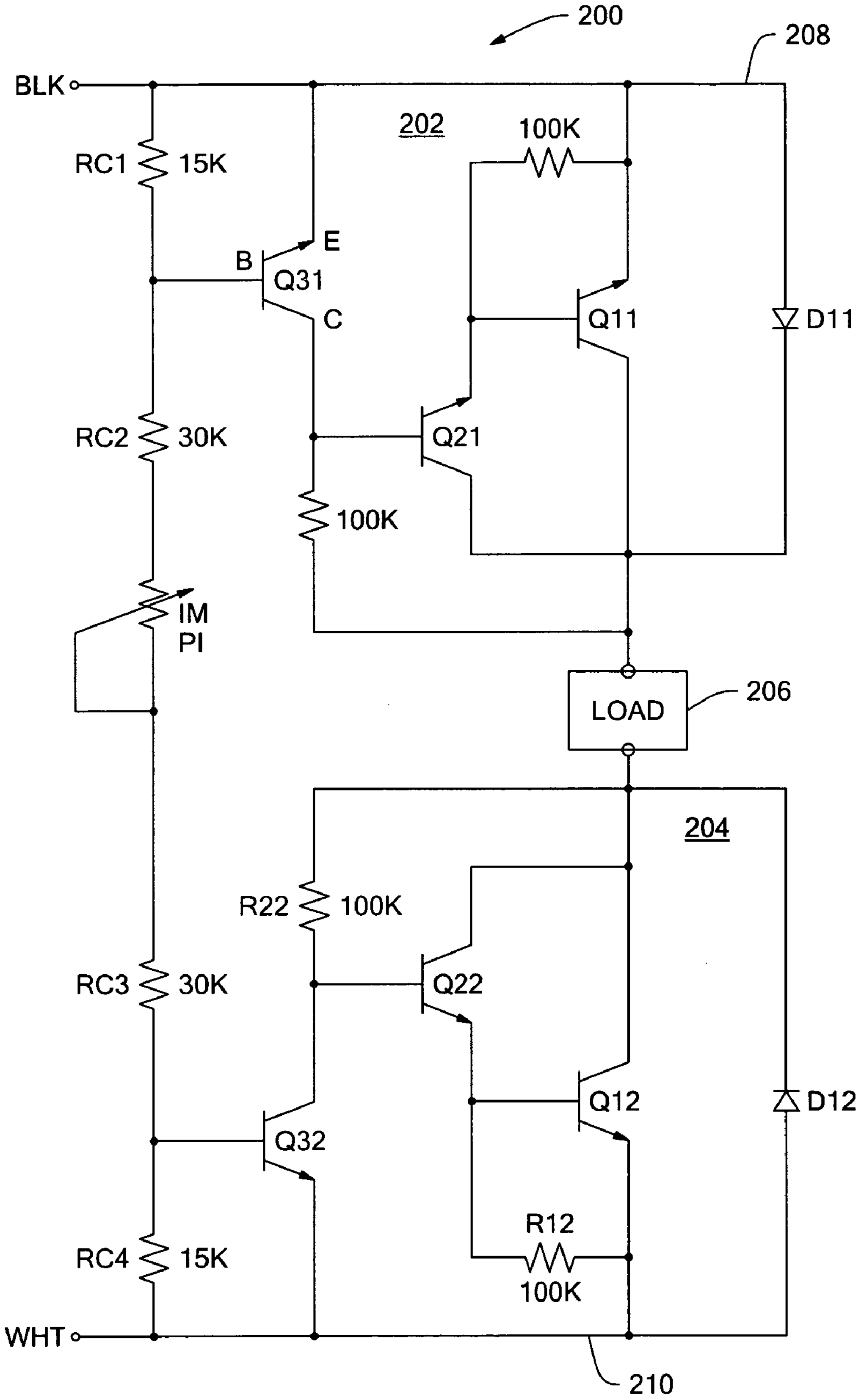
FIG. 7 is an exemplary schematic implementation of a circuit providing power management in accordance with the present invention.

FIG. 7 shows a further embodiment of a circuit 200 having power management in accordance with the present invention. The circuit 200 includes a first control circuit 202 and a second control circuit 204 coupled on either side of a load 206, which can be a nonlinear load. A series of resistors RC1–4 and a potentiometer P1 are coupled end-to-end across first and second AC rails 208, 210.

The first control circuit 202 includes first and second switching elements Q11, Q21, here shown as BJTs, coupled in a Darlington configuration, for energizing the load 206. A third switching element Q31, also shown as a BJT, has an emitter terminal E coupled to the first AC rail 208, a base terminal coupled to a point between the first and second resistors RC1, RC2, and a collector terminal coupled to the base terminal of the second switching element Q21 of the Darlington pair. A diode D11 is coupled between the first AC rail 208 and the load 206 for enabling activation of the circuit during negative half cycles of the AC signal from black and white input terminals BLK, WHT. The second control circuit 204 mirrors the first control circuit for the other half cycle.

In operation, when a voltage between the first and second AC rails 208, 210 is greater than a predetermined threshold voltage, the third switching element Q31 is biased to the conductive state. As the third switching element Q31 is turned ON, the second and first switching elements Q21, Q11 of the Darlington pair are turned off. The resultant AC signal to the load is similar that shown in FIG. 5A, in which the voltage is clamped to a predetermined level Vc. The selected resistance of the potentiometer P1 determines the clamping voltage Vc of the circuit. It is understood that the clamping voltage can be selected to be below the expected peak signal voltage Vp, such as for dimming applications, or above the expected peak signal voltage Vp, for overvoltage protection.

Figure 8:
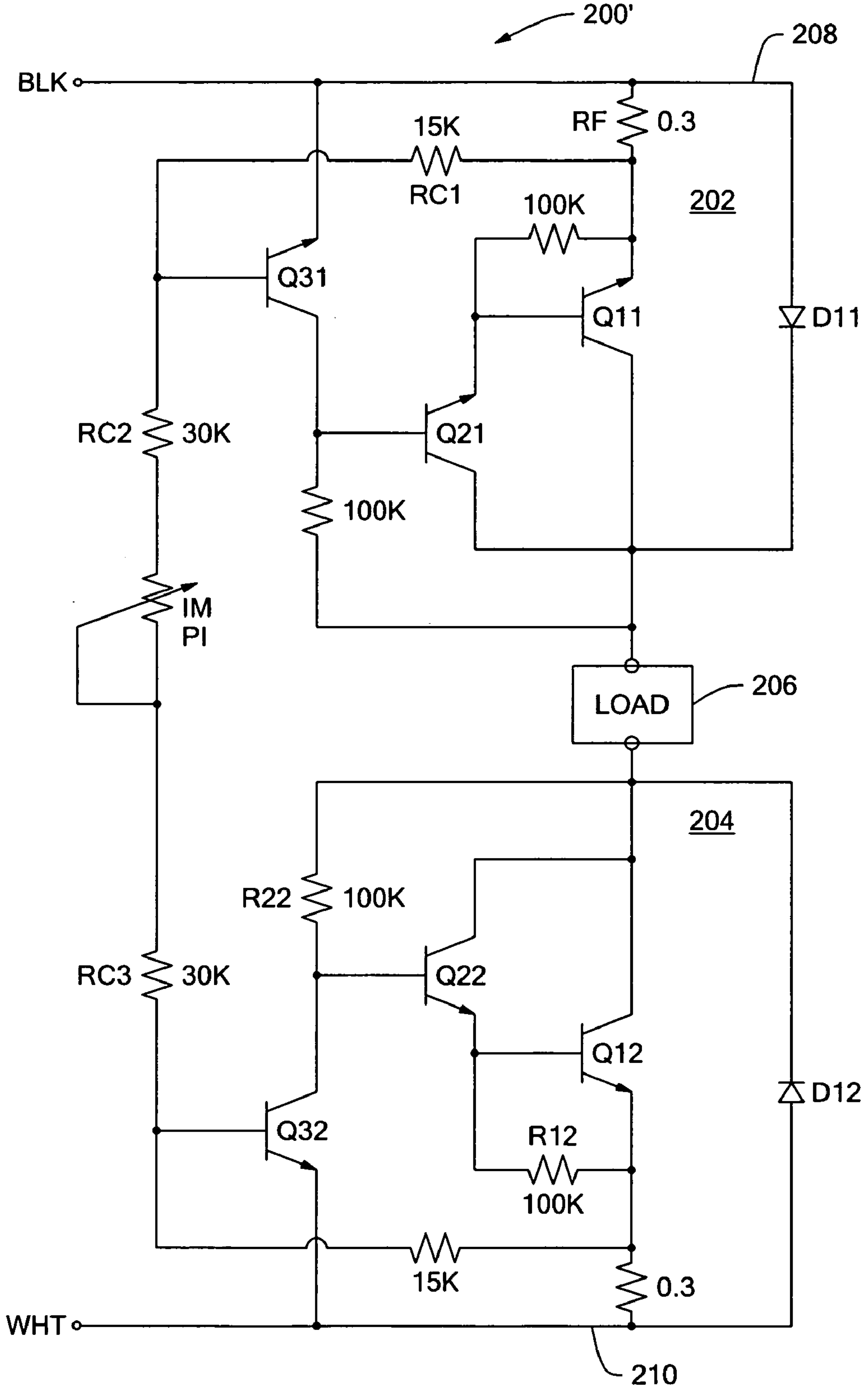
FIG. 8 is a further exemplary schematic implementation of the circuit of FIG.7 further having current limiting features in accordance with the present invention.

FIG. 8 shows the circuit of FIG. 7 with the addition of surge current protection in accordance with the present invention. The first control circuit 202 includes a sense resistor RF coupled between the first AC rail 208 and the first resistor RC1. If the load current becomes greater than a predetermined amount set by the potentiometer P1, the voltage across the sense resistor RF biases the third switching element Q31 to the conductive state so as to turn the Darlington pair Q21, Q11 off.

Figure 9:
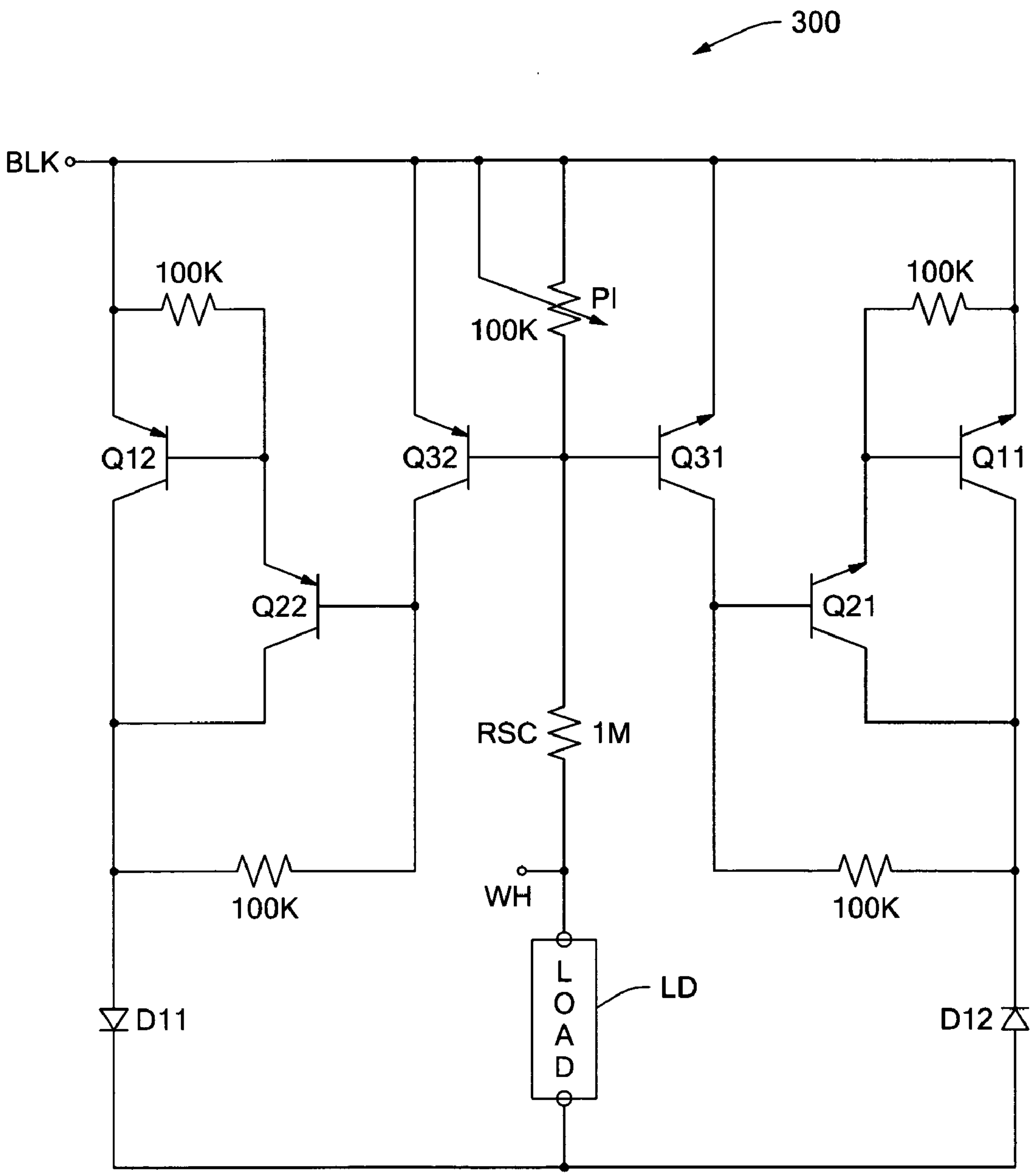
FIG. 9 is another exemplary schematic implementation of a circuit providing power management in accordance with the present invention.

FIG. 9 shows a further circuit 300 having power management in accordance with the present invention referenced to a single AC rail. It is understood that the circuit topology and operation is similar to that shown and described in conjunction with FIG. 7, for example. The circuit 300 includes a first input terminal BLK and a second input terminal WHT, which is coupled to a load LD.

The circuit 300 includes a single potentiometer P1, a scaling resistor RSC, and the load terminals (including the second input terminal WHT) coupled end-to-end, as shown. The potentiometer P1 provides a voltage that biases respective control switching elements Q31, Q32 to a conductive state if the load voltage increases above a predetermined amount determined by the setting of the potentiometer. The control switching elements Q31, Q32, when conductive, turn off the respective Darlington pairs Q12, Q22, and Q21, Q11 to provide selected periods of non-conduction.

Figure 10:
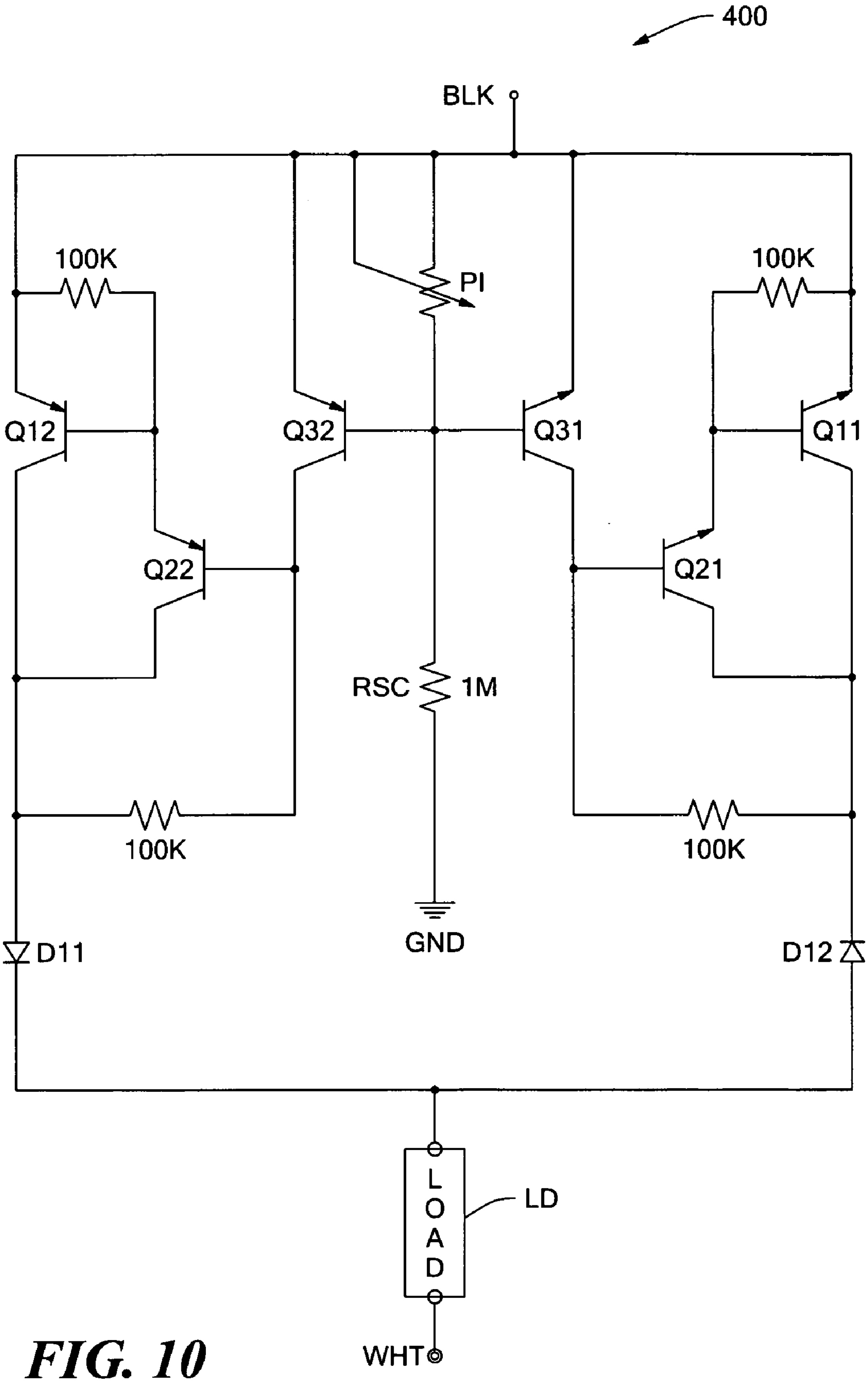
FIG. 10 is another exemplary schematic implementation of a circuit providing power management in accordance with the present invention.

In one particular embodiment, such as that shown in FIG. 10, the scaling resistor RSC is in the order of about 1 MΩ so as to maintain current to a level within applicable safety standards, such as UL (Underwriters Laboratories). Further exemplary circuit component characteristic values are shown. It is understood that for this, and any other embodiment herein, that component values are merely illustrative and can be readily varied by one of ordinary skill in the art. It is understood that this particular arrangement is useful, for example, in the case where one of the terminals, e.g., the white wire, is not readily accessible.

FIG. 10 shows a further exemplary embodiment 400 similar to that shown in FIG. 9 where circuit is referenced to ground. It is understood that the potential difference between the white wire terminal WHT and GND is relatively small since the difference corresponds to the amount of current flow through the scaling resistor RSC. For example, 120V/1MΩ=120μA, which is well within applicable UL safety standards for ground fault current.

Figure 11:
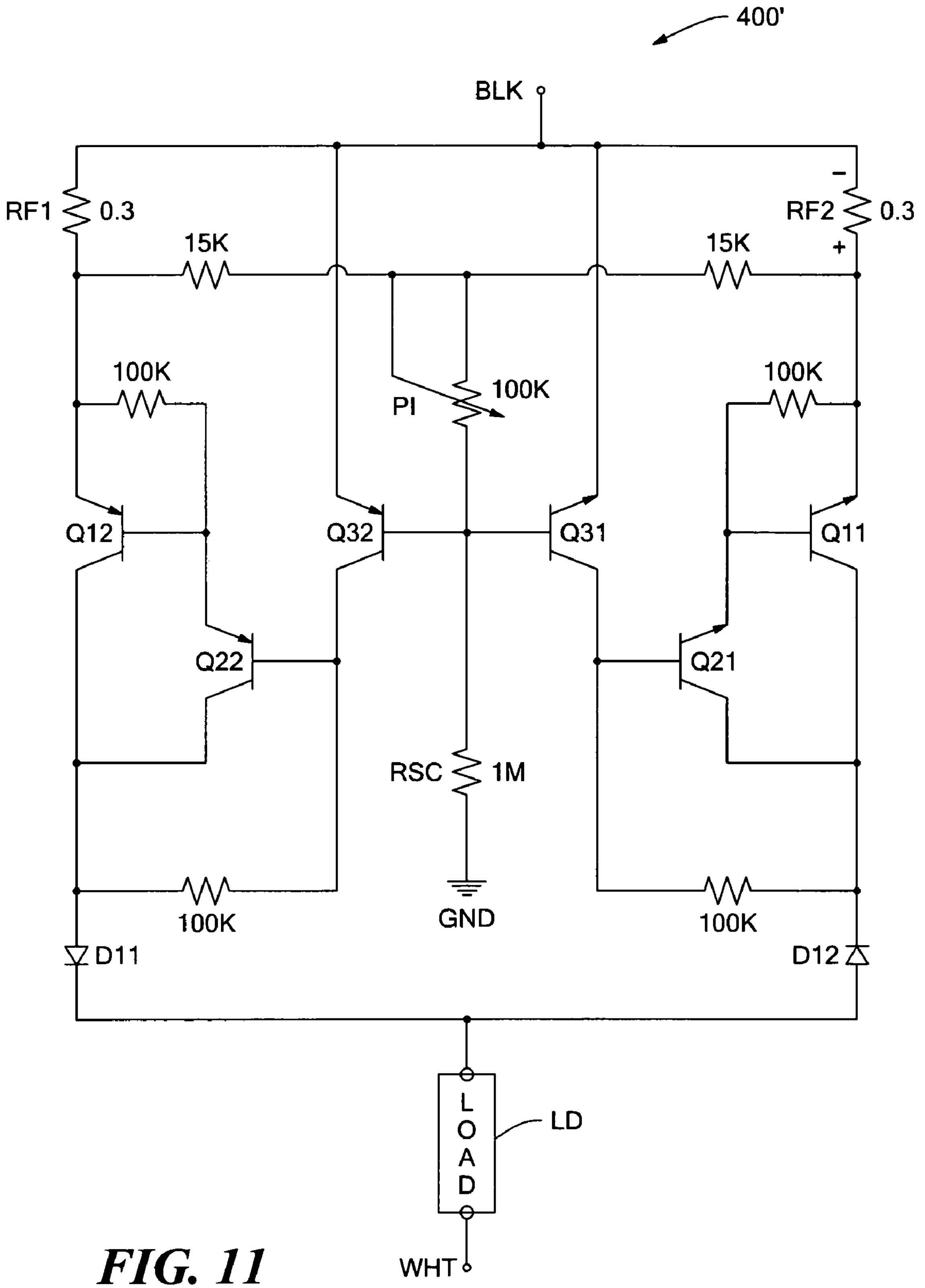
FIG. 11 is another exemplary schematic implementation of a circuit providing power management in accordance with the present invention.

FIG. 11 shows a further embodiment 400' of the circuit of FIG. 10 with the addition of current limiting functionality including first and second sense resistors RF1, RF2. If the current through the load is greater than a predetermined threshold determined by the potentiometer P1, the voltage generated across the sense resistors RF1, RF2 biases the respective first and second control switching elements Q31, Q32 to the conductive state so as to turn the circuit off.

Figure 12:
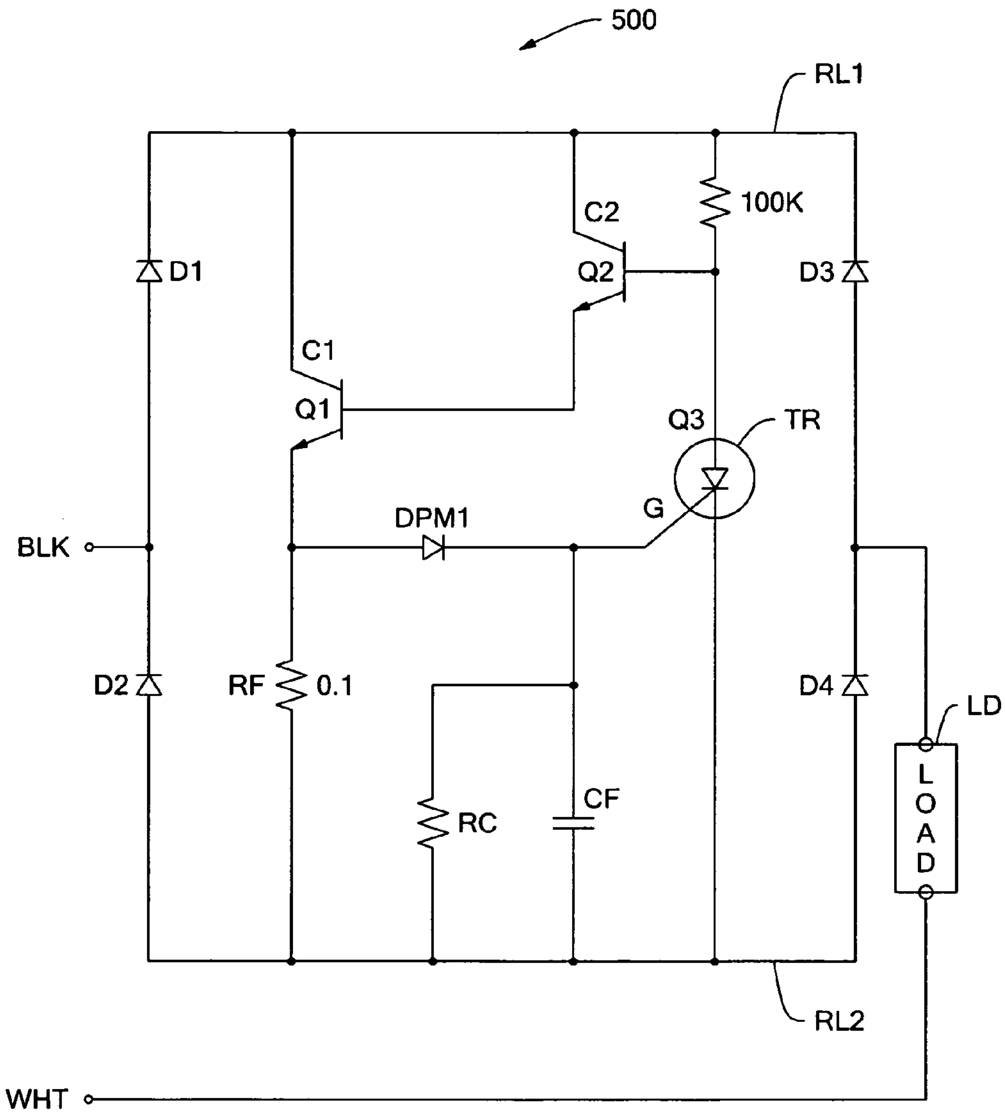
FIG. 12 is another exemplary schematic implementation of a circuit providing power management in accordance with the present invention.

FIG. 12 shows another embodiment of a circuit 500 having power management in accordance with the present invention. An input waveform on first and second input terminals BLK, WHT is rectified by a full bridge rectifier D1, D2, D3, D4. The circuit 500 further includes first and second switching elements Q1, Q2, here shown as BJTs in a Darlington configuration, for energizing a load LD. The collector terminals C1, C2 of the switching elements Q1, Q2 are coupled to a first rail RL1 such that the switching elements are normally in saturation. An emitter terminal E of the first switching element Q1 is coupled to the second rail RL2 via a sense resistor RF. A triac TRis coupled across the first and second rails RL1, RL2 with a gate G coupled to a diode DPM1. A sense capacitor CF is coupled between the triac gate G and the second rail RL2. A resistor RC can be coupled in parallel with the sense capacitor.

When the voltage across the sense resistor RF increases above a predetermined level, the potential at the gate G of the triac biases the triac to the conductive state so as to turn the first and second switching elements Q1, Q2 off until the next zero crossing. The energy stored in the sense capacitor CF can maintain the triac in the conductive state to provide duty cycle control. That is, the circuit can remain off for a number of AC cycles. This circuit can be considered to be a self-resetting electronic fuse.

It is understood that the power management circuits shown and described above have a wide variety of applications including, but not limited to, circuit protectors, voltage regulators, and electronic fuses.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A power management circuit, comprising:

first and second switching elements coupled across first and second rails for energizing a load; and a first power control circuit coupled to the first switching element, wherein the first power control circuit biases the first switching element to a non-conductive state for a portion of a half cycle of an AC signal for electrically disconnecting the load from the first and second rails during which a peak voltage of the AC half cycle occurs when a voltage across the first and second rails is greater than a predetermined threshold.

2. The circuit according to claim 1, wherein a duration of the first switching element being in the non-conductive state is centered about the peak voltage of the AC half cycle.

3. The circuit according to claim 1, wherein the power control circuit includes a potentiometer coupled across the first and second rails for setting the predetermined threshold.

4. The circuit according to claim 3, further including a control switching element coupled to the potentiometer for biasing the first switching element to the non-conductive state when a voltage across the potentiometer is greater than a level corresponding to the predetermined threshold.

5. The circuit according to claim 4, further including a storage capacitor for biasing the first switching element to a conductive state.

6. The circuit according to claim 1, wherein the predetermined threshold is above an expected peak of the AC half cycle for providing overvoltage protection.

7. The circuit according to claim 1, wherein the predetermined threshold is below an expected peak of the AC half cycle.

8. The circuit according to claim 1, further including a control switching element coupled to the first switching element and a sense resistor coupled between the first rail and the first switching element such that the control switching element biases the first switching element to the non-conductive state when a current level through the first switching element is greater than a predetermined current threshold.

9. The circuit according to claim 1, further including a bulk capacitor, wherein the bulk capacitor is charged to the predetermined voltage threshold.

10. The circuit according to claim 1, wherein the first switching element forms part of a Darlington pair.

11. The circuit according to claim 10, wherein the Darlington pair, the load and the second switching element are coupled end-to-end across the first and second rails.

12. The circuit according to claim 11, wherein the load is disposed between the first and second switching elements.

13. The circuit according to claim 10, further including a first diode coupled across the first switching element and a second diode coupled across the second switching element.

14. The circuit according to claim 1, further including referencing voltage levels to a single rail.

15. The circuit according to claim 14, wherein the single rail corresponds to a first wire terminal and a second wire terminal, which is referenced to ground, is relatively inacessible.

16. The circuit according to claim 14, further including a high impedance resistor for coupling to the load to minimize ground fault current.

17. The circuit according to claim 1, further including referencing voltage levels to ground.

18. The circuit according to claim 17, further including first and second input terminals for receiving an AC input signal, wherein the second terminal is adapted for coupling to the load.

19. The circuit according to claim 18, further including a high impedance resistor for coupling to ground, wherein a potential difference between ground and the second terminal corresponds to current through the high impedance resistor.

20. A circuit having power management, comprising:

first and second switching elements coupled between first and second rails for energizing a load;

a first power control circuit for controlling a conductive state of the first switching element;

a second power control circuit for controlling a conductive state of the second switching element;

wherein the first power control circuit includes a control device coupled between the first and second rails and connected to a control switching element, such that the control device biases the control switching element to a conductive state, which biases the first switching element to a non-conductive state, when a voltage across the first and second rails is greater than a predetermined threshold defined by the control device.

21. The circuit according to claim 20, wherein the first power control circuit includes a sense resistor coupled to the first switching element for biasing the control switching element to the conductive state then a current through the sense resistor is greater than a predetermined current threshold.

22. A circuit, comprising:

first and second input terminals for receiving an input AC signal;

first and second diodes coupled end-to-end across first and second rails such that the first input terminal is coupled to a point between the first and second diodes;

a switching circuit including at least one switching element coupled across the first and second rails via a sense resistor;

a clamp switching element having first, second, and third terminals, the first and second terminals being coupled across the first and second rails, the first terminal being coupled to the first switching circuit, and the third terminal being coupled to the sense resistor, wherein the sense resistor biases the clamp switching element to a conductive state, which biases the switching circuit to a non-conductive state, when a voltage across the first and second rails is greater than a predetermined threshold.

23. The circuit according to claim 22, further including a capacitor coupled across the sense resistor for maintaining the clamp switching element in the con-conductive state.

24. The circuit according to claim 22, further including third and fourth diodes coupled end to end across the first and second rails, wherein the load is coupled between the second terminal and a point between the third and fourth diodes.

25. A method of managing power in a circuit, comprising:

selecting a voltage threshold at which an AC signal will be clamped such that a switching element for energizing a load is biased to a non-conductive state during a time that the AC signal is above the voltage threshold such that the load is electrically disconnected from first and second rails when the AC signal is above the voltage threshold.

26. The method according to claim 25, further including centering the time of non-conduction for the switching element symmetrically about a peak of the AC signal.

27. A method of managing power in a circuit comprising:

selecting a voltage threshold at which an AC signal will be clamped such that a switching element for energizing a load is biased to a non-conductive state during a time that the AC signal is above the voltage threshold;

centering the time of non-conduction for the switching element symmetrically about a peak of the AC signal; and charging a storage capacitor to a voltage corresponding to the threshold level.

28. The method according to claim 25, further including generating four current surges for each cycle of the AC signal.

29. The method according to claim 25, further including biasing the switching element to the non-conductive state when a current through the switching element is greater than a predetermined current threshold.

30. The method according to claim 25, further including selecting the threshold voltage using a potentiometer.

31. The method according to claim 25, further including setting the threshold voltage above an expected voltage peak of the AC signal to provide overvoltage protection.

32. The method according to claim 25, further including modifying the threshold voltage to provide dimming of a lamp.

33. A method of managing power in a circuit, comprising:

providing first and second switching elements across first and second rails for energizing a load;

coupling a first control circuit to the first switching element and a second control circuit to the second switching element;

coupling a potentiometer across the first and second rails; and coupling a control switching element to the potentiometer such that the potentiometer biases the control switching element to a state that biases the first switching element to a non-conductive state when a voltage across the first and second rails is greater than a predetermined threshold selected by the potentiometer.

34. The method according to claim 32, further including coupling a sense resistor to the first switching element and to the control switching element such that the sense resistor biases the control switching element to the state that the biases the first switching element to the non-conductive state when a current through the sense resistor is greater than a predetermined current level to provide current surge protection.

35. The method according to claim 32, further including selecting the threshold voltage above an expected peak voltage of an AC signal for energizing the load to provide overvoltage protection.

36. The method according to claim 32, further including centering a time during which the first switching element is non-conductive about a peak of an AC signal for energizing the load.

37. The method according to claim 32, further including adjusting the voltage threshold to provide dimming of a lamp.

* * * * *